July 2, 1968 A. BURGERT 3,391,345
FREQUENCY DISCRIMINATOR WITH TUNED ANTIRESONANT CIRCUITS
Filed July 26, 1965 2 Sheets-Sheet 1

INVENTOR
Albert Burgert
By Paul M. Craig, Jr.
ATTORNEY

July 2, 1968 A. BURGERT 3,391,345

FREQUENCY DISCRIMINATOR WITH TUNED ANTIRESONANT CIRCUITS

Filed July 26, 1965 2 Sheets-Sheet 2

INVENTOR
Albert Burgert
By Paul M. Craig, Jr.
ATTORNEY

United States Patent Office 3,391,345
Patented July 2, 1968

3,391,345
FREQUENCY DISCRIMINATOR WITH TUNED ANTIRESONANT CIRCUITS

Albert Burgert, Arcueil, France, assignor to Compagnie Generale d'Electricite, Paris, France, a corporation of France Filed July 26, 1965, Ser. No. 474,849
Claims priority, application France, July 31, 1964, 983,843; Oct. 21, 1964, 992,170
4 Claims. (Cl. 329—138)

The invention has for its object a new form of demodulator of frequency modulated electric signals, usually known as a frequency discriminator, which more particularly excludes any magnetic coupling of critical value, enabling the adaptation in a wide range of impedances. A frequency discriminator of the well known Foster and Seeley type acts while combining by appropriate means currents, the phase of which varies approximately linearly as a function of the frequency around the nominal frequency of a carrier wave $F_0$, supplying a resulting voltage which is zero when $f=F_0$ and the amplitude of which in the band ranging from $f_0-\Delta F$ to $F+\Delta F$, and following approximately a law of the shape $A=(+ \text{ or } -)\ kF$, $k$ being constant.

The usual applications of this circuit make use of two parallel inductance-capacitance circuits, both tuned on the carrier frequency and presenting two couplings, an inductive coupling and a capacitive coupling or two inductive couplings or again two capacitive couplings. In the known circuits one of the inductive couplings must be adjusted with a high precision at a low value: a usual value of this coupling value is $2/Q$, Q being the overvoltage of the circuits which generally exceeds 100, i.e. this coupling must be adjusted at a value of the order of 2% or less with a good precision otherwise there will be obtained an incorrect discrimination curve and a distorted demodulated signal, or an insufficient pass-band.

It was easy to obtain the desired degree of coupling with air windings or straight magnetic core windings formerly used by letting one of the windings slide with respect to the other on a common mandrel, but with the generalized use of circuits in closed magnetic pots, the adjustment has become more difficult. Either it is necessary to act on the leakages between cores, this being a fringing characteristic which is scarcely reproducible and requires an adjustable and precise mechanical assembly, with various adjustments for each pair of circuits; or a coupling is constituted of some turns common to the two windings in one of the closed cores: which is a difficult and unprecise solution.

It is known by the French Patent 1,020,433 of June 16, 1950, "Improvements to Circuits Detecting Waves Modulated in Frequency," to use two capacitive couplings to the exclusion of any inductive coupling the adjustment of which is difficult, but it replaces it by the setting in common between the two circuits of a part of the tuning capacity, with an unavoidable interaction between tuning capacity and coupling capacity. Besides, the known circuit is essentially of the high impedance type and is well adapted to use with electron tubes but not to the use with transistor amplifiers.

That is why the present invention has for its object to provide a discriminator including more particularly at least one tight coupling transformer with two windings having therebetween no inductive coupling but only one capacitive coupling. Through varying the transformation ratios of the transformers the circuit can be adapted to a large range of impedances, especially on a low output impedance as it is often the case in the transistors.

According to the invention a frequency discriminator operating in a given band comprises an input circuit formed by a first tight coupling transformer the primary winding of which is tuned on the central frequency of the pass-band by a capacity in parallel, an output circuit of a second tight coupling transformer, the primary winding of which is tuned in the same conditions; both primary windings being coupled by a capacitor and the secondary of the output circuit delivering into a network comprising in series a first rectifier, a first resistance capacitance circuit in parallel, a second resistance capacitance circuit identical to the first one, a second rectifier identical to the first one, the secondary of the input circuit being connected on the one hand to an intermediate connector of the secondary of the input circuit, and on the other hand to the common point between the two said resistance capacitance circuits.

According to another embodiment, a frequency discriminator circuit includes a tight coupling transformer having a primary tuned on the intermediate frequency carrier, a mid-point secondary delivering into a network comprising a first diode, two capacitors connected in series, a second diode connected with opposite polarity with respect to the first one, two resistors series connected in parallel to the two said series connected capacitors a tuned circuit connected between the mid-point of the transformer secondary and the point common to the two capacitors, which is connected to ground, with a low capacitive coupling between one end of said primary and said mid-point of the secondary, the demodulated voltage being received between the point common to the said resistors and ground.

The invention will be further described in grater detail with reference to the drawings, in which.

Figure 1:
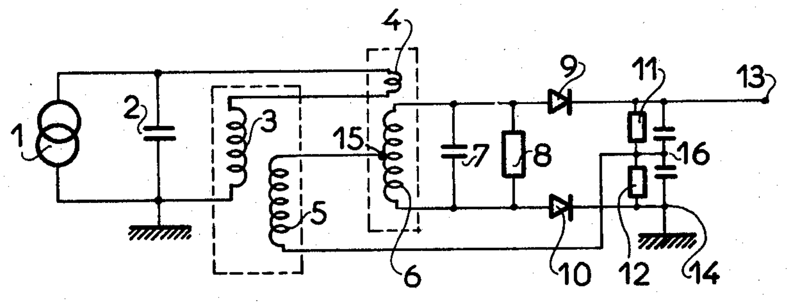
FIG. 1 PRIOR ART
FIGURE 1 shows a known discriminator circuit.

In FIGURE 1, the source 1 delivers a supply voltage to a tuned input circuit constituted by the winding 3 and the capacitor 2 connected in parallel therewith. A tuned output circuit, constituted by a winding 6 shunted by a capacitor 7 and by a damping resistor 8 delivers into a rectifier circuit comprising in series a diode 9, a first circuit RC 11, a second circuit RC 12, and a diode 10. A winding 5 in tight coupling with the winding 3 has an end connected to point 15, which is the mid-point of the winding 6, and the other end connected to point 16, which is a point common to the two RC circuits 11 and 12. The turns 4 constitute a loose coupling which is adjusted with precision between the winding 3 and the winding 6. The demodulated signal is received between the terminal 13, a point common to the diode 9 and to the circuit RC 11, and the terminal 14, a point common to the diode 10 and the circuit RC 12 which is connected to ground.

Figure 2:
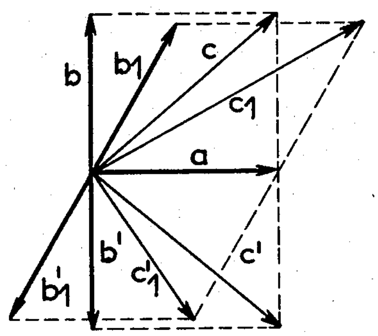
FIGURE 2 is a vector diagram illustrating the known discriminator operation.

In FIGURE 2 the current $a$ is supplied by the winding 5. The currents $b$ and $b'$ circulating respectively in both halves of the winding 6 under the effect of the loose coupling are in quadrature with the current $a$ for the tuning frequency. This results in, as is well known, between the terminals 13 and 14, a current which is the modular difference between the currents $c$ and $c'$: this difference is zero for the tuning frequency, i.e. the central frequency of the pass-band $F_0$.

For another frequency of the operating range, $F_0+\Delta F$, the reference $a$ is still the same but the vectors in opposition $b$–$b'$ take the position $b_1$–$b'_1$: the difference between the diagonals $c_1$–$c'_1$ is no longer equal to zero. The polarity of this difference becomes inverse when the sign of ΔF is reversed.

Figure 3:
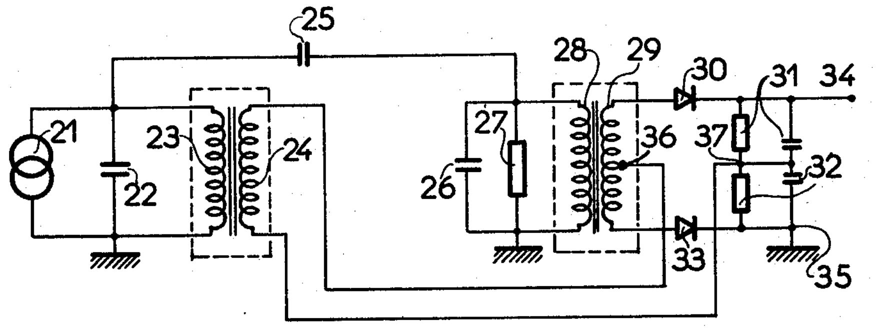
FIGURE 3 is a schematic view corresponding to a first embodiment of the discriminator according to the invention.

In FIGURE 3 which shows a frequency discriminator according to the invention, the source 21 delivers into a tuned input circuit formed by the winding 23 and the capacitor 22 in parallel therewith. A closed output circuit formed by the capacitor 26, the resistor 27 and the winding 28 in parallel is tight coupled with the winding 29 which delivers into a network including in series a diode 30, a parallel connected RC circuit 31. A second RC circuit 32 identical to the preceding one, and a second diode 33 identical to the diode 30. A winding 24 tight coupled with the winding 23 injects a current between the mid-point 36 of the winding 29 and the point 37 which is common to the two RC circuits mentioned in the foregoing. The capacitor 25 forms a coupling between the tuned input circuit and the tuned output circuit. The demodulated signal is received between the terminals 34 and 35.

Figure 4:
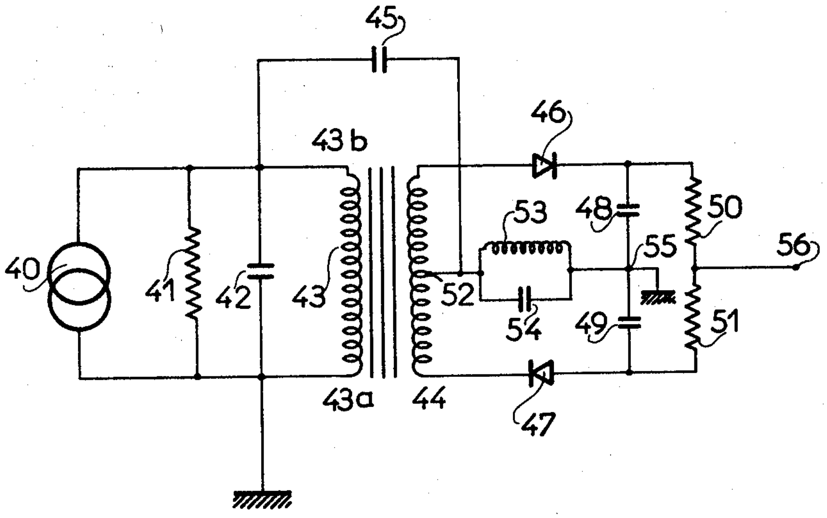
FIGURE 4 is a schematic view corresponding to a second embodiment of the discriminator according to the invention.

In FIGURE 4, the source 40 delivers into the primary 43 of a transformer, tuned by a capacitor 42 in parallel, and damped preferentially by a resistor 41 in parallel in order to obtain a sufficiently broad band. A first end of the primary **43*a* is connected to ground. The secondary 44 of said transformer has a mid-point 52 coupled by a small capacitor 45 to a second end of the primary 43*b*. The secondary 44 is connected to two diodes 46, 47 disposed oppositely to each other, the circuit of which is closed by two capacitors in series 50, 51. Between the mid-point 52 of the transformer secondary and the grounded mid-point 55 common to said capacitors is placed a circuit tuned on said intermediary frequency carrier including a winding 53 shunted by a capacitor 54. The demodulated low frequency voltage is received between point 56, at the middle point of the two resistors, and point 55**.

The sum of a current induced by the tuned primary 43 and a current generated by the potential difference at the terminals of the tuned circuit 53–54, flow in the winding 44. This last current is subdivided into two halves circulating in opposite directions in the two halves of the secondary 44 which are respectively in leading and lagging quadrature with said induced current. This results in the low frequency demodulated currents which circulate behind the diodes 46, 47 in the resistors 50, 51, being of opposite direction. Being equal in amplitude at the intermediary frequency, they provide for this frequency a zero potential difference between point 56 and the earth. When the frequency deviates by a small value of plus or minus ΔF from the carrier F, the induced current and the two preceding half currents are no longer in quadrature, but a dephasing occurs which is an approximately linear function of ΔF. This results in that, for a frequency F which is small and positive, a voltage of a certain polarity is obtained between point 56 and ground, which for a negative ΔF of the same amplitude, a voltage of the same value having the inverse polarity is obtained.

The vector diagram of the circuit of the invention is exactly the same as the one of the known circuit shown in FIGURE 2.

The discriminator according to the invention is easy to build with the modern technology of the closed magnetic pots; it does not include any magnetic nor capacitive coupling the adjustment of which is difficult or in interaction, but only a capacitive coupling loose by capacity easy to adjust and non-critical, inductive couplings of the tight type.

Besides, adjusting the transformation ratios between the windings 23/24 on the one hand and 28/29 on the other hand, it is possible to adapt the circuit in a wide range of impedances.

What I claim is:

1. A frequency discriminator for electric waves of a defined nominal frequency carrier modulated in frequency, comprising a first antiresonant circuit tuned to the carrier frequency, a second antiresonant circuit tuned to the carrier frequency, an output circuit composed of two diodes connected to respective ends of two equal resistors in series, and two equal capacitors connected in parallel to respective ones of said resistors, a first tight coupling transformer having a primary winding forming part of said first antiresonant circuit, a second tight coupling transformer having a primary winding forming part of said second antiresonant circuit, the primary winding of said second transformer being coupled to the primary winding of said first transformer by means of an impedance, the secondary winding of said second transformer being provided with a center tap and being connected to said output circuit, said diodes being directed in the same direction, and the secondary of the first transformer being connected between said center tap and the common point of connection of said resistors, the demodulated signal being obtained across the series connected resistors.

2. A frequency discriminator according to claim 1 in which the said coupling impedance between the primaries of said first and second transformers is a capacitor.

3. A discriminator for electrical waves of a defined nominal carrier frequency modulated in frequency, comprising a first antiresonant circuit tuned to the carrier frequency, a second antiresonant circuit tuned to the carrier frequency, an output circuit formed by two diodes connected to respective ends of two equal resistors in series and two equal capacitors connected in series across said series connected resistors, said two diodes being pulled in opposite directions, a tight coupling transformer having a primary winding forming part of said first antiresonant circuit, the secondary winding of which has a center tap and is connected to said output circuit, said second antiresonant circuit being connected between said center tap and the common point of connection of said two capacitors, and a coupling impedance connected between the transformer primary and the said center tap, the demodulated signal being received between the common point of connection of said resistors and the common point of connection of said capacitors.

4. A frequency discriminator according to claim 3 in which said impedance is a capacitor.

References Cited

UNITED STATES PATENTS

| | | | |
|---|---|---|---|
| 2,420,248 | 5/1947 | Koch | 329—138 X |
| 3,046,486 | 7/1962 | Rhodes | 329—138 |
| 3,063,019 | 11/1962 | De Waard et al. | 329—137 X |

ALFRED L. BRODY, *Primary Examiner.*